(12) United States Patent
Sanders

(10) Patent No.: US 11,063,519 B2
(45) Date of Patent: Jul. 13, 2021

(54) EFFICIENT HIGH VOLTAGE POWER SUPPLY FOR PULSE CAPACITOR DISCHARGE APPLICATIONS

(71) Applicant: Howard Sanders, Batavia, IL (US)

(72) Inventor: Howard Sanders, Batavia, IL (US)

( * ) Notice: Subject to any disclaimer, the term of this patent is extended or adjusted under 35 U.S.C. 154(b) by 0 days.

(21) Appl. No.: 16/401,426

(22) Filed: May 2, 2019

(65) Prior Publication Data
US 2020/0350824 A1 Nov. 5, 2020

(51) Int. Cl.
*H02M 3/335* (2006.01)
*H02M 1/44* (2007.01)
*H02M 1/00* (2006.01)

(52) U.S. Cl.
CPC ......... *H02M 3/33569* (2013.01); *H02M 1/44* (2013.01); *H02M 2001/0009* (2013.01); *H02M 2001/0054* (2013.01)

(58) Field of Classification Search
CPC ............ H02M 3/00; H02M 3/22; H02M 3/24; H02M 3/28; H02M 3/325; H02M 3/335; H02M 3/33507; H02M 3/33515; H02M 3/3353; H02M 3/33538; H02M 3/33546; H02M 3/33553; H02M 3/33569; H02M 1/12; H02M 1/14; H02M 1/143; H02M 1/146; H02M 1/15; H02M 1/32; H02M 1/34; H02M 1/44; H02M 2001/0009; H02M 2001/0016; H02M 2001/0048; H02M 2001/0051; H02M 2001/0054; H02M 2001/0058; H02M 2001/0064; H02M 2001/123; H02M 2001/322; H02M 2001/342; H02M 2001/344; H02M 2001/346; H02M 2001/348; H02M 3/33576; H02M 3/33584; H02M 3/33592; H02M 7/42; H02M 7/44; H02M 7/48; H02M 7/4815; H02M 7/4818; H02M 7/4826
USPC ...... 363/15–21.18, 40–43, 56.12, 74, 95–99, 363/123, 124, 131–134; 323/205–211, 323/266, 271–277, 282–288, 351
See application file for complete search history.

(56) References Cited

U.S. PATENT DOCUMENTS

| 3,332,001 | A | * | 7/1967 | Schwarz | ............... H02M 7/523 363/135 |
| 4,611,152 | A | | 9/1986 | Hishiki et al. | |
| 4,955,806 | A | * | 9/1990 | Grunden | ................. F23N 5/203 340/579 |

(Continued)

OTHER PUBLICATIONS

PCT Search Report, dated 2020.

*Primary Examiner* — Thienvu V Tran
*Assistant Examiner* — Carlos O Rivera-Perez
(74) *Attorney, Agent, or Firm* — Erickson Law Group, PC

(57) ABSTRACT

An efficient high voltage power supply suitable for capacitor discharge applications is provided by eliminating the need for complex timing controls and the addition of parts required for capacitor discharge applications. The use of three steps in the inverter section, a charge, discharge and revert steps, generally eliminates the complex timing requirements typically associated with high voltage power supplies while still achieving high efficiency. The addition of a high voltage relay, resistor, and appropriately specified diodes in the rectifier section makes the power supply more applicable for use in capacitor discharge applications than existing commercial off-the-shelf high voltage power supplies.

21 Claims, 6 Drawing Sheets

(56) References Cited

U.S. PATENT DOCUMENTS

| | | |
|---|---|---|
| 5,060,130 A | 10/1991 | Steigerwald |
| 5,638,260 A | 6/1997 | Bees |
| 5,663,873 A | 9/1997 | Bhagwat et al. |
| 6,687,137 B1 | 2/2004 | Yasumura |
| 6,697,266 B2 * | 2/2004 | Poon ........................ H02M 7/08 363/17 |
| 8,503,195 B1 | 8/2013 | Mogilevski |
| 2005/0023988 A1 * | 2/2005 | Komatsu ............ H05B 41/2822 315/224 |
| 2005/0047175 A1 | 3/2005 | Kawasak et al. |
| 2007/0081365 A1 * | 4/2007 | Yasumura ........... H02M 3/3381 363/21.02 |
| 2009/0251925 A1 | 10/2009 | Usui et al. |
| 2010/0289532 A1 * | 11/2010 | Wendt ................... H02M 3/335 327/103 |
| 2014/0266044 A1 * | 9/2014 | Kang ..................... H02H 9/045 320/109 |
| 2017/0099011 A1 * | 4/2017 | Freeman ................ H02M 7/06 |
| 2018/0034359 A1 * | 2/2018 | Chen ..................... H02M 1/083 |
| 2018/0041138 A1 * | 2/2018 | Nishikawa .............. H02M 7/48 |

* cited by examiner

EFFICIENT HIGH VOLTAGE POWER SUPPLY FOR PULSE CAPACITOR DISCHARGE APPLICATIONS

BACKGROUND

The present invention relates generally to switching power converters. More particularly, the present invention relates to the configuration of the transistors in the inverter stage of a switching power supply. Rather than traditional half-bridge or full-bridge configurations, this invention uses pulse discharge in three steps to achieve efficient and reliable conversion of a DC voltage into a higher DC voltage.

An early example of a high-efficiency power supply can be seen in U.S. Pat. No. 5,060,130. The circuit in this patent, like many others of similar design, use resonant conversion through a half-bridge or full-bridge connection of switching devices. The resonant nature of this configuration results in the ideal zero-voltage switching (ZVS) of the transistors. That is, the transistors will turn on when there is no voltage across them or current going through them. This reduces the turn-on switching losses to near zero as well as having zero turn-off losses. The present inventor has recognized, however, that extremely complex timing controls are needed to achieve ZVS as the resonant frequency of the circuit will change related to manufacturing tolerances, environmental conditions, and load parameters. The present inventor has recognized that if the circuit does not have proper control then the efficiency of the system will decline or, potentially, the inverter stage will fail. For ZVS to be efficient, timing controls need to follow the resonant frequency to better than 1% or better than 25 nanoseconds.

One of the mainstays in capacitor charging power supplies is disclosed by U.S. Pat. No. 5,638,260. This patent uses a half-bridge configuration and a bipolar DC voltage source on the inverter stage. The present inventor has recognized that this patented design is robust but still requires complex timing controls.

U.S. Pat. No. 8,503,195 is an example using a half-bridge topology with a single voltage DC Source and relates to an improvement in the control method for the transistors in the inverter stage. The present inventor has recognized however that this configuration still requires complex timing controls.

The present inventor has recognized that the issue with complex timing controls is that the conditions of the system are not stable and are further exacerbated by the typical electromagnetic interference (EMI) emitted by pulse discharge applications. The present inventor has recognized that it is, therefore, desirable to have an efficient circuit which does not have complex timing requirements. Further, the present inventor has recognized that the ideal design should easily handle EMI, variations in circuit inductance or capacitance, or other environmental factors.

SUMMARY

An exemplary embodiment of the invention provides a power supply for converting a first DC voltage to a higher second DC voltage. The power supply includes an inverter section with a primary-side capacitor and a plurality of switching devices to convert the first DC voltage into alternating current pulses, wherein the generation of the alternating current pulses is completed in first, second and third steps. The first step is to charge the primary-side capacitor to a capacitor first voltage of a first polarity across the primary-side capacitor, the second step is to discharge the primary-side capacitor to a capacitor second voltage across the primary-side capacitor, of a second polarity opposite to the first polarity, and the third step is to charge the primary-side capacitor to a capacitor third voltage of the first polarity across the primary-side capacitor.

A transformer section includes two primary windings and at least one secondary winding having a larger number of turns than the primary windings. The primary windings are connected to the primary-side capacitor. A rectifier section is connected to the secondary winding and includes multiple diodes assembled to rectify the alternating current pulses on the secondary winding of the transformer section into a second DC voltage greater than the first DC voltage.

The capacitor first voltage can be greater than the capacitor third voltage. For example the capacitor third voltage can be about 0% to about 90% of the capacitor first voltage, more particularly about 10% to about 90% of the capacitor first voltage.

Advantageously, the rectifier section further comprises a feedback voltage monitor in the rectifier section; and the power supply further comprises a control section which receives an output from the feedback voltage monitor and input signals from a user, and based in part on the output from the feedback voltage monitor and the input signals from a user, outputs control signals to the switching devices in the inverter section thereby controlling the second DC voltage to a pre-selected level. The second DC voltage can be greater than 1000 to 5000% of the first DC voltage.

Advantageously, the two primary coils in the transformer section can have the same number of turns.

Advantageously, the inverter section uses three switching devices, one for each of the three steps. Each switching device can comprise a transistor in series with a diode.

Advantageously, the rectifier section can include a resistor in series with the second DC voltage wherein the resistor limits output current and wherein the diodes can operate at the maximum output current as set by the resistor.

Advantageously, the rectifier section can include a high voltage relay to discharge the second DC voltage in response to a fault condition.

Advantageously, the diodes in the rectifier section are connected in a full-bridge configuration.

Advantageously, the first DC voltage is derived from an AC to DC converter with an AC input filter to prevent noise from being emitted back to the AC line.

Advantageously, the earth ground can be isolated by a resistor in parallel with a varistor from the second DC voltage return, reducing the noise emitted back to earth ground.

As an alternate to a bridge configuration, the diodes in the rectifier section can be arranged in a voltage doubler configuration. This allows the second DC voltage to be twice as high as the voltage would be if the diodes were in a full-bridge configuration.

Advantageously, the transformer section uses two cores, wherein the primary windings are around both cores and the secondary windings are split between the two cores, allowing a higher gain.

The result of the desired circuit topology is a resonant configuration in the inverter section that does not use switching devices connected in either a half-bridge or a full-bridge. An exemplary embodiment of this invention uses switching devices in three steps where only one device is switched on at any time.

An exemplary embodiment of the invention provides a single DC voltage source, an inverter section, a transformer providing both a step up in voltage and galvanic isolation, and a high-voltage rectifier on the secondary side of the transformer. However, the bridge configuration of switching devices in the inverter section is replaced with three switching devices connected to a single capacitance.

The first switching device is used to charge the single capacitance up to a full charge voltage. A charge current is coupled through the primary side of the transformer. A series diode prevents current reversal which allows for the switching devices to be turned off with no voltage across the device or current through the device. Further, this diode allows for a boost in charge voltage of the capacitance versus the primary-side DC input voltage due to the inductance of the primary winding.

The second switching device discharges the capacitance through a second primary winding. This second primary winding is oriented such that the discharge current resets the magnetic flux in the transformer core so as to prevent core saturation which would otherwise impact the conversion efficiency. A series diode prevents current reversal which allows for the switching devices to be turned off with no voltage across the device or current through the device. This, typically, results in the capacitor charge voltage reversing polarity which requires the switching devices to have a higher voltage rating than just the DC input voltage.

The third switching device inverts the capacitor charge voltage again through the second primary winding. This reversed current again resets the magnetic flux in the transformer core so as to prevent core saturation which would otherwise impact the conversion efficiency. A series diode prevents current reversal which allows for the switching devices to be turned off with no voltage across the device or current through the device. Depending on the energy delivered to the load during the three steps, the voltage on the capacitance is now at some value between 0 and the DC input voltage.

The timing of the three steps is not critical. The switching devices can be on much longer than the actual current for each step to assure that the current has dropped to zero and there will be no turn-off switching losses. Further, the timing between each step can be long to assure that each device has properly recovered before proceeding to the next step. Therefore, the system can operate without consideration of any effects related to changing resonant frequencies related to manufacturing tolerances, environmental conditions, and load parameters. Chokes, signal filtering, higher voltage gate drive and low gate drive impedance, assures that electromagnetic interference (EMI) will not impact the performance of the system. While chokes, signal filtering and higher voltage gate drives increase control timing inaccuracies, the design in an exemplary embodiment of this invention is tolerant of any timing. In an exemplary embodiment of the present invention, the timing accuracy can be on the order of 1 microseconds or 40 times larger than for prior ZVS based designs.

Because timing is not critical, an exemplary embodiment of the present invention can use a larger resonant capacitance. A larger resonant capacitance would have further complicated the timing requirement in prior ZVS based designs. However, for an exemplary embodiment of the present invention, the larger resonant capacitance means that the system can operate at a lower frequency, which reduces switching losses so that the total losses for an exemplary embodiment of the present invention are on the same order as those in prior ZVS based designs.

An exemplary embodiment of present invention is designed to survive load fault conditions. If load fault is related to a condition equivalent to a short then the output voltage, as measured through a feedback monitor, does not rise during the charging and the control circuit will reduce the switching speed to prevent damage to the system from overheating. The internal capacitance on the secondary side of the transformer, which prevents the voltage from rising too high from a single switching event of the inverter section, along with the voltage rating of the high voltage rectifier prevents any damage due to a load fault related to a condition equivalent to too low a capacitance on the load. Lastly, the high voltage rectifier diodes are rated for the maximum current potentially seen during typical capacitor discharge applications where the load voltage may completely invert.

The power supply of the embodiments of the present invention can be useful for applications such as for Extracorporeal Shock Wave Therapy, Pulsed Electromagnetic Field Therapy, and pulsed power water and flue-gas treatment.

Numerous other advantages and features of the present invention will become readily apparent from the following detailed description of the invention and the embodiments thereof, from the claims and from the accompanying drawings.

DETAILED DESCRIPTION

Figure 1:
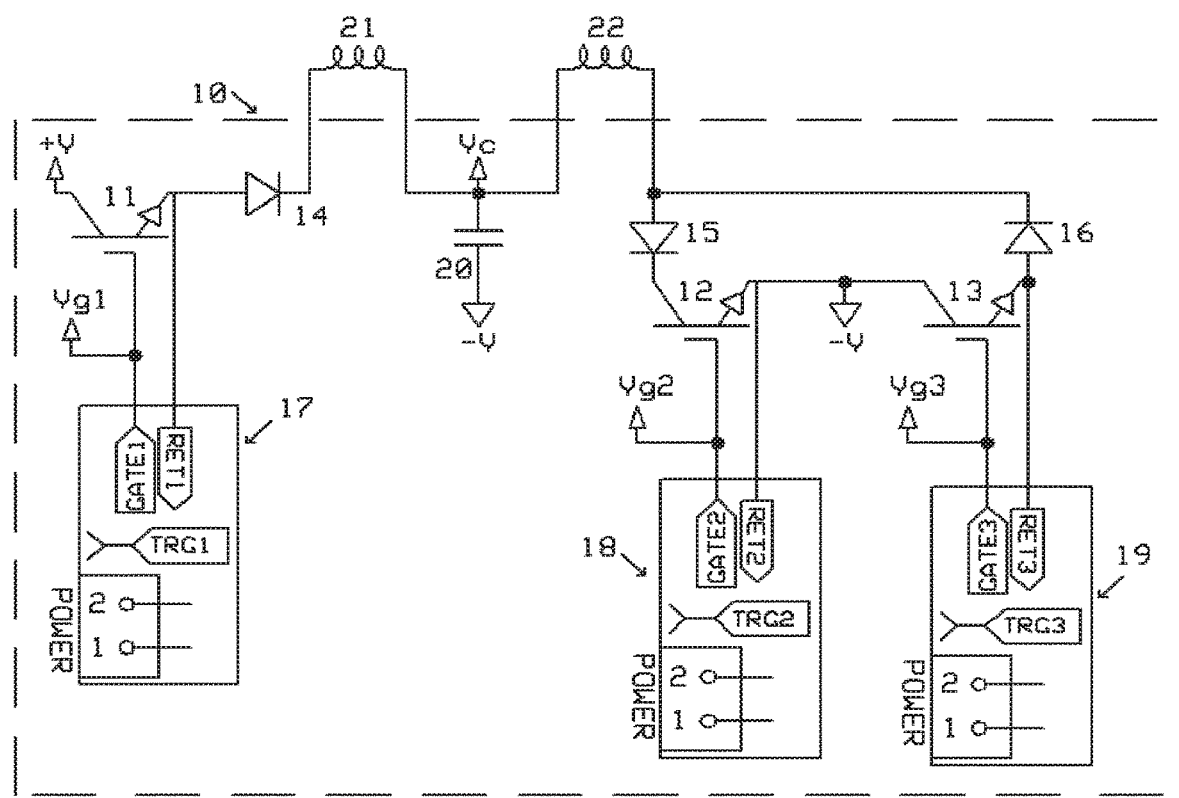
FIG. 1 is a schematic diagram of an inverter section of an embodiment of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Throughout the specification and claims, the following terms take at least the meanings explicitly associated herein, unless the context dictates otherwise. The meanings identified below do not necessarily limit the terms, but merely provide illustrative examples for the terms. The use of singular or plural in a situation is not meant to preclude the alternative such that singular may also include plural instances and plural instances may also include singular instances.

The term "inverter" refers to the section containing switching devices on the primary side of a transformer, potentially including other passive or active parts such as diodes, capacitors, resistors, gate drives, etc.

The term "switching device", either in singular or plural, may refer to a variety of transistors as known in the art including, but not limited to FET, MOSFET, IGBT, IGCT, BJT, etc., as well as SCR, thyristors, MOS gated thyristors, MOS controlled thyristors, or any other solid state device. Any reference to "gate" or "base" refers to the control connection of the switching device. Any reference to "source" could also be a reference to emitter for an IGBT or cathode for a thyristor. The term switching device would also include multiple independent devices acting simultaneously at the same point in the circuit, either in parallel or in series, as might be used to increase the current or voltage capability.

The term "transformer" refers to the section between the inverter and the high voltage rectifier. The term "core" refers to the magnetic material around which the primary and secondary wires are wound. The term "primary" refers to the wire connected to the inverter and the inverter is considered the primary side while the term "secondary" refers to wires connected to the high voltage rectifier and the high voltage rectifier is considered the secondary side. The core material may include powder, ferrite, tape wound iron alloys, amorphous or nanocrystalline. The core may be made up of multiple independent components such that wires are wound around several different units either in parallel or series configuration. For example, a core might include two ferrite toroids and the wires are wound around them both stacked together, thereby increasing the area included in each turn, or the wires are wound around them separately either in parallel or in series resulting in double the output current or output voltage as obtained from one ferrite toroid by itself.

The term "high voltage rectifier" refers to the set of diodes which will convert an alternating current on the secondary winding into a direct current of a polarity designed to charge the load to high voltage. The high voltage rectifier may include other passive parts such as resistors and capacitors. Other components on the secondary side of the transformer may include feedback voltage or current monitors to allow control of the output to a specified voltage or current level.

This application incorporates by reference U.S. Pat. Nos. 5,060,130; 5,638,260; and 8,503,195 in their entireties to the extent that the patents are not contrary to the presently described embodiments.

Referring to FIG. 1, one embodiment of an inverter section 10 includes three switching devices 11, 12, 13, three diodes 14, 15, 16, three gate drive circuits 17, 18, 19, and a primary-side capacitor 20. Vg1 is the gate-source voltage or signal voltage on the first switching device 11, wherein the voltage Vg1 closes the switching device 11. Vg2 is the gate-source voltage or signal voltage on the second switching device 12, wherein the voltage Vg2 closes the switching device 12. Vg3 is the gate-source voltage or signal voltage on the third switching device 13, wherein the voltage Vg3 closes the switching device 13. Vg1, Vg2 and Vg3 are controlled by the control signals TRG1, TRG2, and TRG3 respectively. Vc is the voltage across the primary-side capacitor 20. Two primary wires or windings 21, 22 are shown in FIG. 1 but are part of the transformer section. The voltages +V and −V are set by a DC power supply 23 that connects to the inverter section.

For an example embodiment of the invention, the steps can be represented as the charge, discharge and revert steps. The first step, charge, is where capacitor 20 is being charged from +V through the first switching device 11, a diode 14, and through one primary wire 21 to a capacitor first voltage. The second step, discharge, is where primary-side capacitor 20 is being discharged through the second switching device 12, a diode 15, and through the second primary wire 22 to a capacitor second voltage. The third step, revert, is where the voltage on primary-side capacitor 20 is being inverted through the third switching device 13, a diode 16, and the second primary wire 22 to a capacitor third voltage.

Figure 2A:
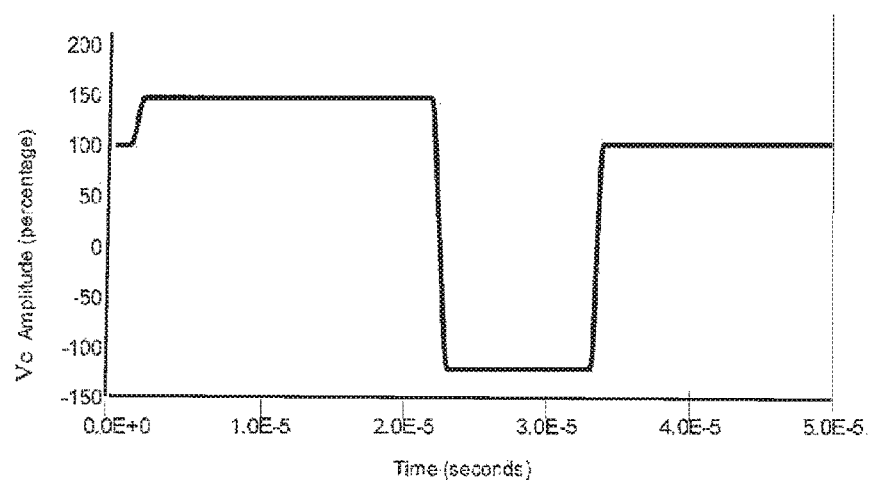
FIG. 2a is a graph of percentage voltage across a primary-side capacitor versus time of the inverter section of FIG. 1.

For an example embodiment and method of the invention, FIG. 2a-2d show the timing of the gate signals Vg1, Vg2, and Vg3 as compared to the voltage Vc across capacitor 20. In FIG. 2a, the voltage Vc across capacitor 20 is reported as a percentage amplitude where the percentage is relative to a value approximating the RMS voltage across capacitor 20 being at +100%. As can be seen in the example, the voltage Vc rises from +100% to +150% in the first step to a capacitor first voltage and then goes from 150% to −125% in the second step to a capacitor second voltage and then from −125% to +100% in the third step to a capacitor third voltage. After the third step, the system is ready to repeat the same steps over again. These percentages of Vc are only an example and could go as high as +200% or as low as −200%.

The capacitor voltage Vc after the first step can be greater than the capacitor voltage Vc after the third step. For example the capacitor voltage Vc after the third step can be about 0% to about 90% of the capacitor voltage Vc after the first step, more particularly about 10% to about 90% of the capacitor voltage Vc after the first step.

Figure 2B:
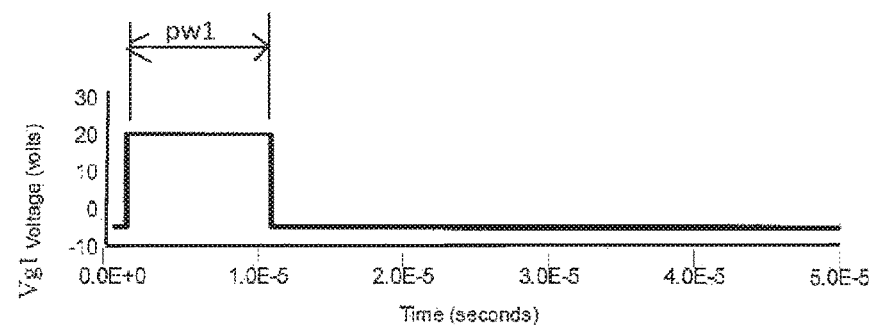
FIG. 2b is a graph of a first gate-source voltage on a first switch versus time of the inverter section of FIG. 1.
Figure 2C:
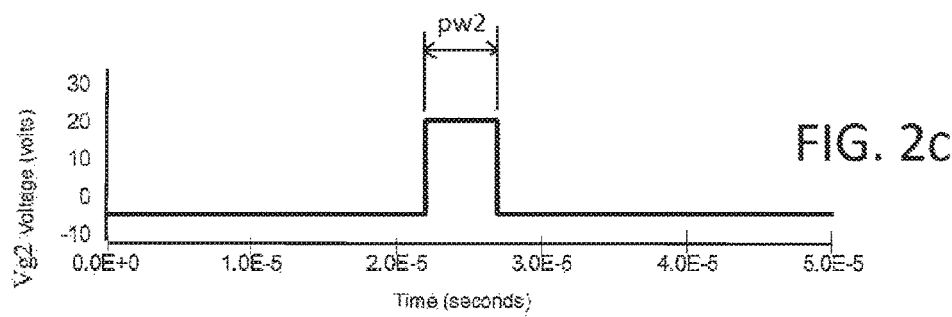
FIG. 2c is a graph of a second gate-source voltage on a second switch versus time of the inverter section of FIG. 1.
Figure 2D:
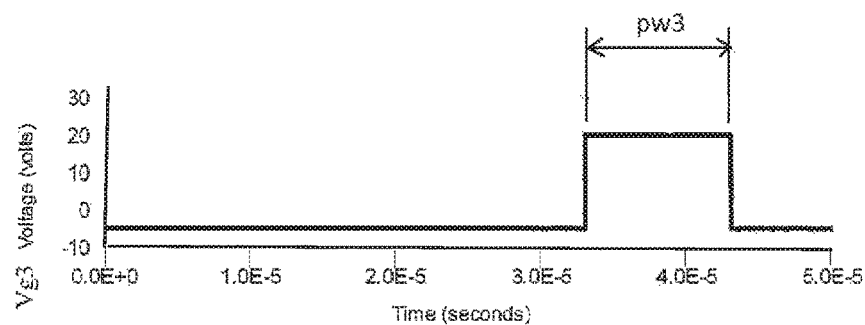
FIG. 2d is a graph of a third gate-source voltage on a third switch versus time of the inverter section of FIG. 1.

As described above, the timing of the gate signals Vg1, Vg2, and Vg3 is not as critical as in current state of the art designs. FIGS. 2b, 2c and 2d illustrate an example timing of the gate signals Vg1, Vg2, and Vg3. Where the timing in the current state of the art must match the resonant frequency of the system, the pulse widths pw1, pw2, pw3 of Vg1, Vg2, and Vg3 can be as short as one half period of a resonant frequency of the LC circuit comprising either winding 21 and capacitor 20, or winding 22 and capacitor 20, or much longer. The time between Vg1 and Vg2 or the time between Vg2 and Vg3 can be longer than the turn-off delay time of the switching device used. The timings shown are longer than a minimum to assure that any jitter in the timing signals does not cause any problems. For example, the half period of a resonant frequency of the LC circuit of either winding 21 and capacitor 20, or winding 22 and capacitor 20, is on the order of 1 μsec while the pulse widths are on the order of 5 or 10 μsec. Also, the switching technology has a turn-off delay time on the order of 100 nsec while the time between gate signals is on the order of 5 or 10 μsec. The time between Vg3 and the next Vg1 is set by the control circuit based on the inputs and can be as short as 5 or 10 μsec or as long as 200 msec or more.

Figure 3:
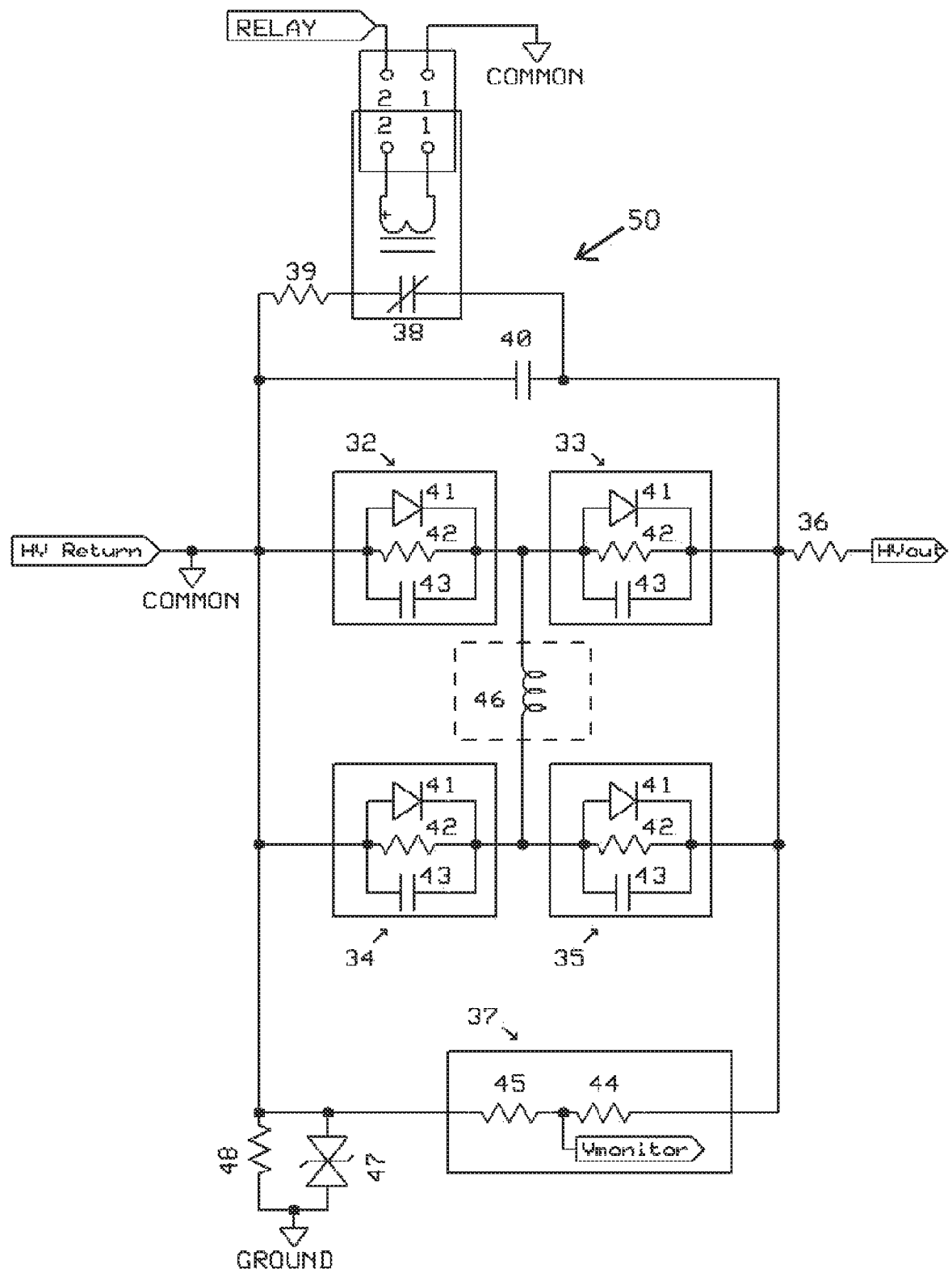
FIG. 3 is a schematic diagram of a high voltage rectifier section of an embodiment of the present invention.

An important part of the efficient high voltage power supply for capacitor discharge applications is the design of the high voltage rectifier section. FIG. 3 shows an example embodiment of the invention in terms of a high voltage rectifier section 50. In this case, there are four sets of diode modules 32, 33, 34, 35, which represent the four legs of a bridge rectifier, an output current limiting resistor 36, a feedback voltage monitor 37, a high voltage relay 38, a dump resistor 39, a secondary-side capacitor 40, a varistor 47, and a grounding resistor 48. The secondary winding of the transformer is shown as 46 to show how it connects to the high voltage rectifier section.

Figure 3A:
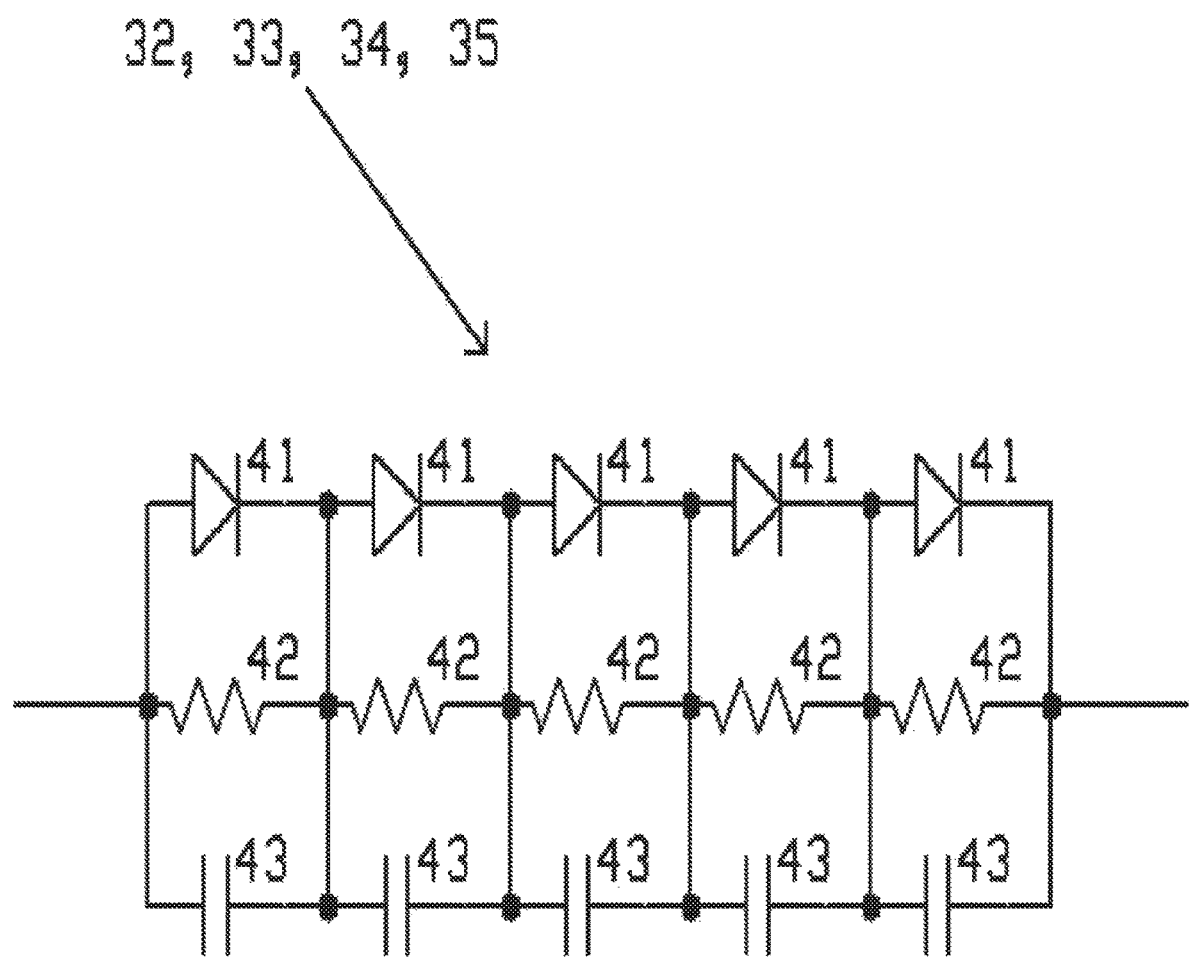
FIG. 3a is a schematic diagram, of a portion of FIG. 3.
Figure 4:
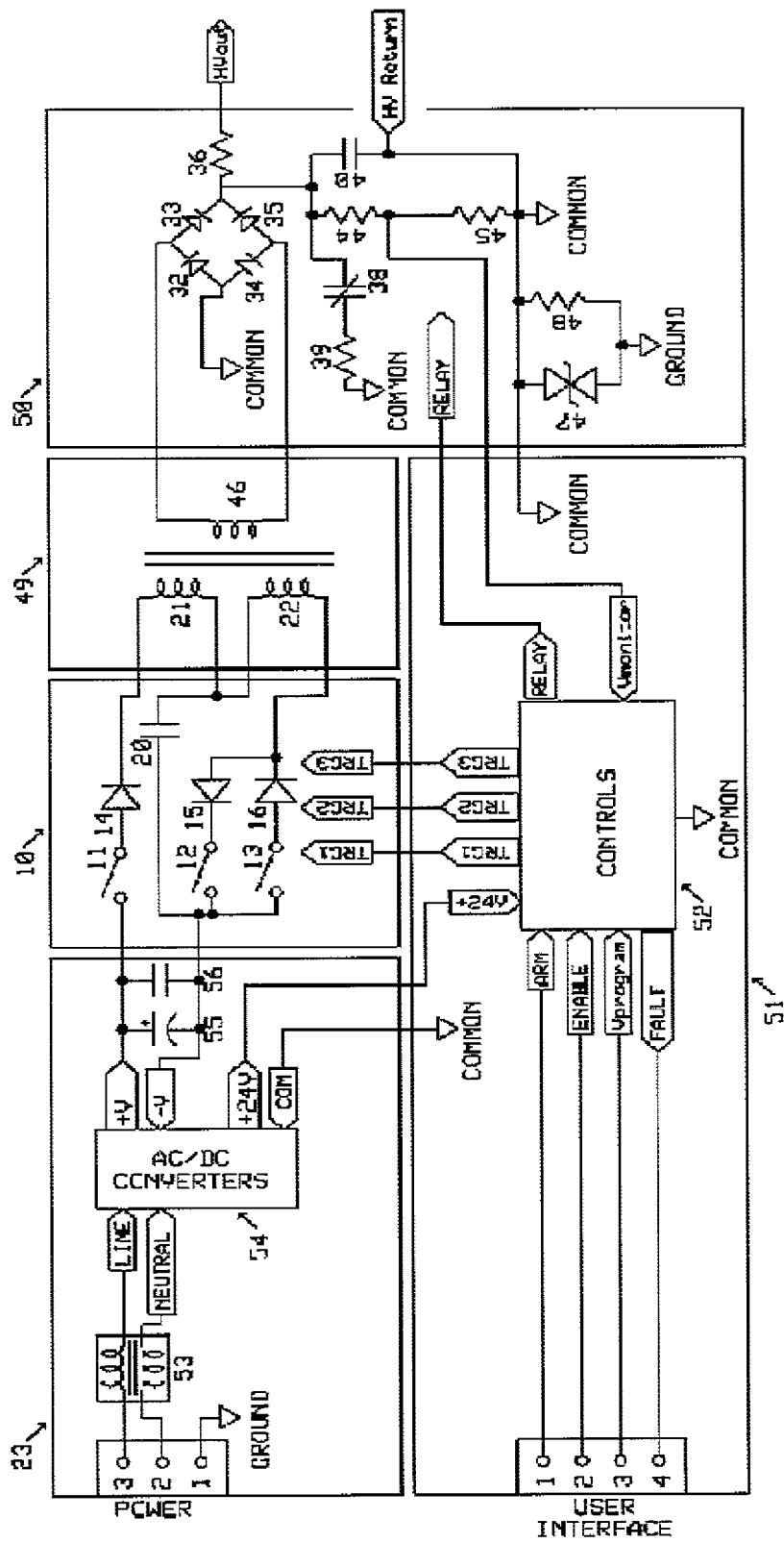
FIG. 4 is a schematic diagram of a complete system of an embodiment of the present invention.

As shown in FIG. 3a, each diode module 32, 33, 34, 35 can each be comprised of a set of diodes 41, resistors 42 and capacitors 43 in parallel. Only one set of diodes, resistors and capacitors for each diode module is shown in FIG. 3 for simplicity, and only diodes for the diode module 32, 33, 34, 35 are shown in FIG. 4 for simplicity.

The output current limiting resistor 36 is designed to keep the current through the diodes 41 from exceeding their rating even if the output voltage inverts. The high voltage relay 38 and dump resistor 39 are designed to safely discharge the load in case of a system fault. Having properly rated diodes, high voltage relay and dump resistor integral to the high voltage power supply reduces the need for the end user to add these components external to the high voltage power supply.

The maximum energy stored in primary-side capacitor 20 on the primary side will determine the maximum voltage error on the secondary side by the inclusion of the secondary-side capacitor 40. For example, if capacitor 20 was 470 nF and charged to a voltage of 200 V then it stores 9.4 mJ by the formula $E=0.5*C*V^2$. If the secondary-side capacitor 40 was 10 nF then even without a load the voltage on the secondary-side can only get to 4228.5 V starting from 4000 V by the same equation. The capacitance of the secondary-side capacitor 40 thus prevents an output over-voltage from damaging the diodes 41.

Dump resistor 39 needs to be able to absorb all the energy stored in the load. Bulk ceramic resistors can absorb large pulse energies without failure and are therefore suitable, as an example. The resistance of the dump resistor 39 should be selected to prevent over-current in the high voltage relay 38. Several manufacturers produce suitable reed or vacuum relays such as COTO, GIGAVAC, KILOVAC, etc.

The feedback voltage monitor 37 comprises a resistive voltage divider with a large resistance 44 and a small resistance 45. The ratio of the resistance of the small resistor 45 to the sum of the resistance of the large resistor 44 and the small resistor 45 defines the ratio of the voltage monitor. The point between the large 44 and small 45 resistor define the feedback voltage Vmonitor.

The varistor 47 and grounding resistor 48 allow the common potential of the high voltage return connection to float slightly versus earth ground during charge and discharge. This prevents feedback to the power source which might otherwise cause flicker or other interference on components connected to the same power source.

Figure 3B:
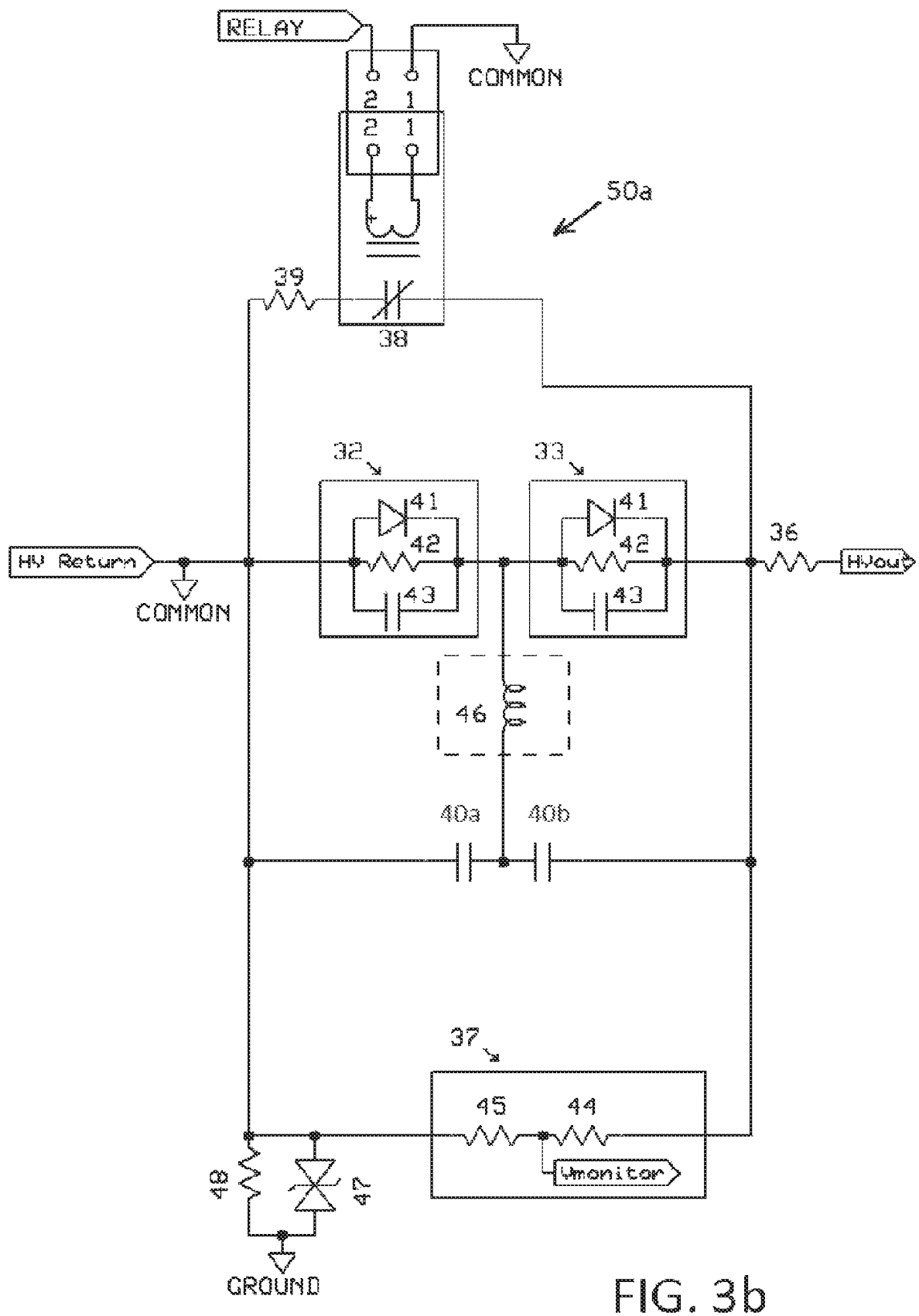
FIG. 3b is a schematic diagram of an alternate high voltage rectifier section of an embodiment of the present invention.

FIG. 3b illustrates an alternate rectifier section 50a to replace the rectifier section 50 of FIG. 3, configured in a voltage doubler circuit. Rather than configured in a full bridge, the diodes in the rectifier section can be in a voltage doubler configuration allowing the second DC voltage to be twice as high as the voltage would be if the diodes were in a full-bridge configuration. The diode modules 34 and 35 are eliminated and two capacitors 40a, 40b replace the capacitor 40 and are connected to the secondary winding 46. Voltage doubler rectification is described in U.S. Pat. Nos. 5,663,873 and 6,687,137, herein incorporated by reference to the extent that these patents are not contrary to the presently described embodiments.

An example embodiment of the complete system can be seen in FIG. 4. In addition to the parts designated in FIG. 1-FIG. 3b, FIG. 4 shows the transformer section 49 and the control section 51. Also shown are the connections to the high voltage rectifier section 50. The control section 51 takes in signals for ARM, ENABLE, Vprogram and Vmonitor, and outputs the control signals for the triggers TRG1, TRG2, and TRG3 as well as the high voltage RELAY control as determined by the control section 52. The ARM input signal is used to determine the output control signal to the high voltage RELAY. The ENABLE input signal is used to activate the inverter output controls TRG1, TRG2, and TRG3 as necessary to achieve a Vmonitor feedback signal that matches the Vprogram input signal having a preselected value.

Further, in FIG. 4, one embodiment DC power supply 23 could include AC to DC conversion 54, a set of capacitors 55 and 56, a power factor correction circuit, and an input filter 53. The AC to DC conversion 54 could include a section that outputs +V versus −V and a section that outputs 24 VDC versus COMMON. In the example embodiment −V is isolated from COMMON but could be the same in alternate configurations. The capacitors could be a mix of electrolytic 55 and film 56 capacitors of suitable voltage rating to prevent large ripple voltages on +V while also acting as a low impedance source. The input filter 53 can be rated for the peak input current and frequency while filtering out the typical frequencies seen in a capacitor discharge application.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A power supply for converting a DC voltage to a higher DC voltage, the power supply comprising:
    an inverter section with a primary-side capacitor having first and second terminals and first, second and third switching devices to convert a first DC voltage into alternating current pulses, where the generation of the alternating current pulses is completed in first, second and third steps;
    a transformer section with plural primary windings, and at least one secondary winding having a larger number of turns than the primary windings;
    wherein the first terminal of the primary-side capacitor is connected between two primary windings and the first step is to charge the primary-side capacitor to a capacitor first voltage of a first polarity across the primary-side capacitor actuated by the first switching device with a first end connected thereof to the first DC voltage and a second end of the first switching device connected to a first end of one primary winding of the plurality of primary windings, and the second step is to discharge the primary-side capacitor to a capacitor second voltage across the primary-side capacitor, of a second polarity opposite to the first polarity, actuated by the second switching device with a first end thereof connected to one primary winding of the plurality of primary windings, and a second end thereof connected to the second terminal of the primary capacitor, and the third step is to charge the primary-side capacitor to a capacitor third voltage of the first polarity across the primary-side capacitor actuated by the third switching device with a first end thereof connected to the second terminal of the primary capacitor and a second end thereof connected to one primary winding of the plurality of primary windings;
    and
    a rectifier section, the secondary winding connected to the rectifier section, the rectifier section comprising multiple diodes assembled to rectify the alternating current pulses on the secondary winding of the transformer section into a second DC voltage greater than the first DC voltage.

2. The power supply according to claim 1, wherein the capacitor first voltage is greater than the capacitor third voltage.

3. The power supply according to claim 2, wherein the capacitor third voltage is about 10% to about 90% of the capacitor first voltage.

4. The power supply according to claim 1, wherein the rectifier section further comprises a feedback voltage monitor in the rectifier section; and the power supply further comprises a control section which receives an output from the feedback voltage monitor and input signals from a user, and based in part on the output from the feedback voltage monitor and the input signals from a user, outputs control signals to the first second and third switching devices in the inverter section thereby controlling the second DC voltage to a pre-selected level.

5. The power supply according to claim 1, wherein the second DC voltage is between about 1000% and 5000% of the first DC voltage.

6. The power supply according to claim 1, wherein two primary coils in the transformer section have the same number of turns.

7. The power supply according to claim 1, wherein each first, second and third switching device is closed by a signal voltage having a pulse width of at least one half period of a resonant frequency of an LC circuit comprising either one of the windings and the primary-side capacitor.

8. The power supply according to claim 7, wherein a time period between signal voltages for each first, second and third of the switching devices is greater than a turn-off delay time of the first, second and third of the switching devices.

9. The power supply of claim 8, where each first, second and third switching device comprises a transistor in series with a diode.

10. The power supply according to claim 1, where the rectifier section includes a resistor in series with the second DC voltage where this resistor limits output current and wherein the diodes can operate at a maximum output current as set by the resistor.

11. The power supply according to claim 1, where the rectifier section includes a high voltage relay to discharge the second DC voltage.

12. The power supply according to claim 1, where the diodes in the rectifier section are connected in a full-bridge configuration.

13. The power supply according to claim 1, where the first DC voltage is derived from an AC to DC converter with an AC input filter to prevent noise from being emitted back to an AC line.

14. The power supply according to claim 1, where earth ground is isolated by a resistor in parallel with a varistor from the second DC voltage return reducing the noise emitted back to earth ground.

15. The power supply according to claim 1, where the diodes in the rectifier section are in a voltage doubler configuration allowing the second DC voltage to be twice as high as the voltage would be if the diodes were in a full-bridge configuration.

16. The power supply according to claim 1, where the transformer section uses two cores, with the primary windings wound around both cores and the at least one secondary winding comprises two secondary windings and the secondary windings are split between the two cores, allowing a higher gain.

17. The power supply according to claim 1, wherein the rectifier section includes a resistor in series with the second DC voltage where this resistor limits output current and where the diodes are designed to operate at a maximum output current as set by the resistor and where the rectifier section has a high voltage relay to discharge the second DC voltage, and where the diodes in the rectifier section are connected in a full-bridge configuration, and where the first DC voltage is derived from an AC to DC converter with an AC input filter to prevent noise from being emitted back to an AC line, and where earth ground is isolated by a resistor in parallel with a varistor from the second DC voltage return, reducing the noise emitted back to earth ground.

18. The power supply according to claim 17, further comprising a current monitor feedback to the control section for fault mode detection.

19. The power supply according to claim 1, wherein during a first step current is drawn through a first primary winding of the plurality of primary windings, and in a second step current is drawn through a second primary winding of the plurality of primary windings, and in a third step current is drawn through the second primary winding.

20. The power supply according to claim 1, wherein during a first step current is drawn through a first primary winding of said plurality of primary windings, and in a second step current is drawn through a second primary winding of said plurality of primary windings, and in a third step current is drawn through the second primary winding of said plurality of primary windings;
   wherein the first switching device is connected at the second end thereof to a first end of a first diode, the first diode connected at a second end thereof to a first end of the first primary winding and a second end of the first primary winding is connected to the first terminal of the primary-side capacitor, and the first terminal of the primary-side capacitor is also connected to a first end of the second primary winding, and a second end of the second primary winding is connected to a first end of a second diode which is connected at a second end thereof to the first end of the second switching device which is connected at the second end thereof to the second terminal of the primary-side capacitor and also to the first end of the third switching device which is connected at the second end thereof to a first end of a third diode which is connected at a second end thereof to the second end of the second primary winding.

21. The power supply according to claim 20, wherein each first, second and third switching device is dosed by a signal voltage having a pulse width of at least one half period of a resonant frequency of an LC circuit comprising either one of the first and second primary windings and the primary-side capacitor.

* * * * *